United States Patent

[11] 3,598,495

[72] Inventor John A. Cupler, II
 10 Cupler Drive - LaVale, Md. 21502
[21] Appl. No. 875,327
[22] Filed Nov. 10, 1969
[45] Patented Aug. 10, 1971
 Continuation-in-part of application Ser. No.
 715,711, Mar. 25, 1968, now Patent No.
 3,478,419, dated Nov. 18, 1969.

[54] METHOD AND APPARATUS FOR CONDUCTING MACROMACHINING OPERATIONS
 8 Claims, 4 Drawing Figs.
[52] U.S. Cl. .................................................. 408/35,
 29/568, 29/26
[51] Int. Cl. ............................................... B23q 3/157
[50] Field of Search ................................. 29/26, 568;
 77/22

[56] References Cited
 UNITED STATES PATENTS
 931,119 8/1909 Hocking .................... 77/22

2,096,754 10/1937 Oberhoffken et al. ........ 77/22
3,478,419 11/1969 Cupler .......................... 29/568

Primary Examiner—Andrew R. Juhasz
Assistant Examiner—Z. R. Bilinsky
Attorney—Colton & Stone ABSTRACT: The disclosure introduces an extension of the noncaptive tool changer principles, previously utilized primarily in connection with micromachining operations, to include larger or macro tools.

The disclosure is directed to methods and apparatus for automatically interchanging a plurality of noncaptive rotary tools between working and nonworking positions; for imparting continual rotation to both the working and nonworking tools at all times that any one tool is actually working; for effecting tool interchange without disrupting the continual rotational input to any of the tools; and for infeeding and retracting a working tool, relative to its bearing support, under the respective influences of an elongated rotary cam and a wide chain link drive including dynamic biasing means.

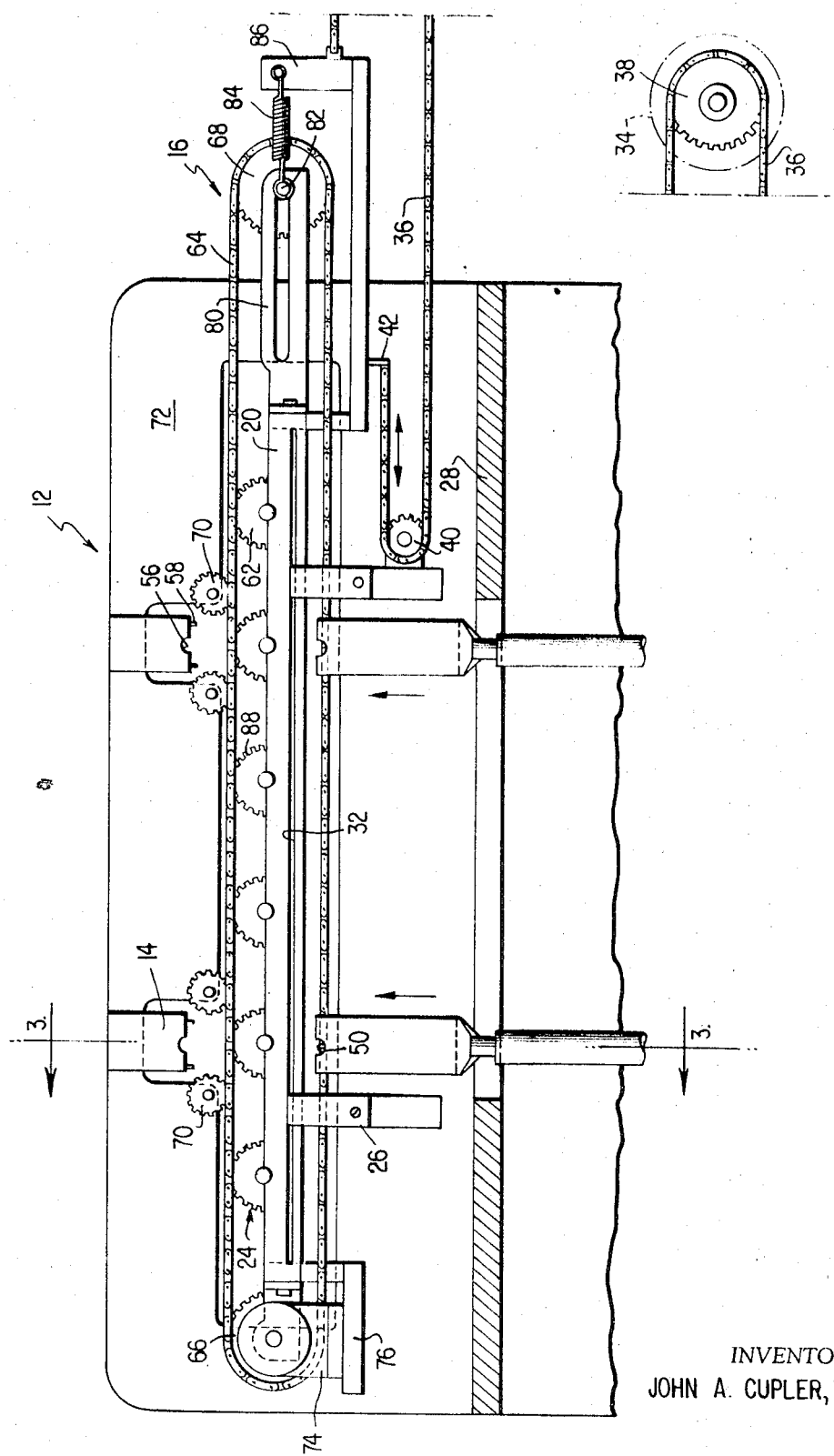

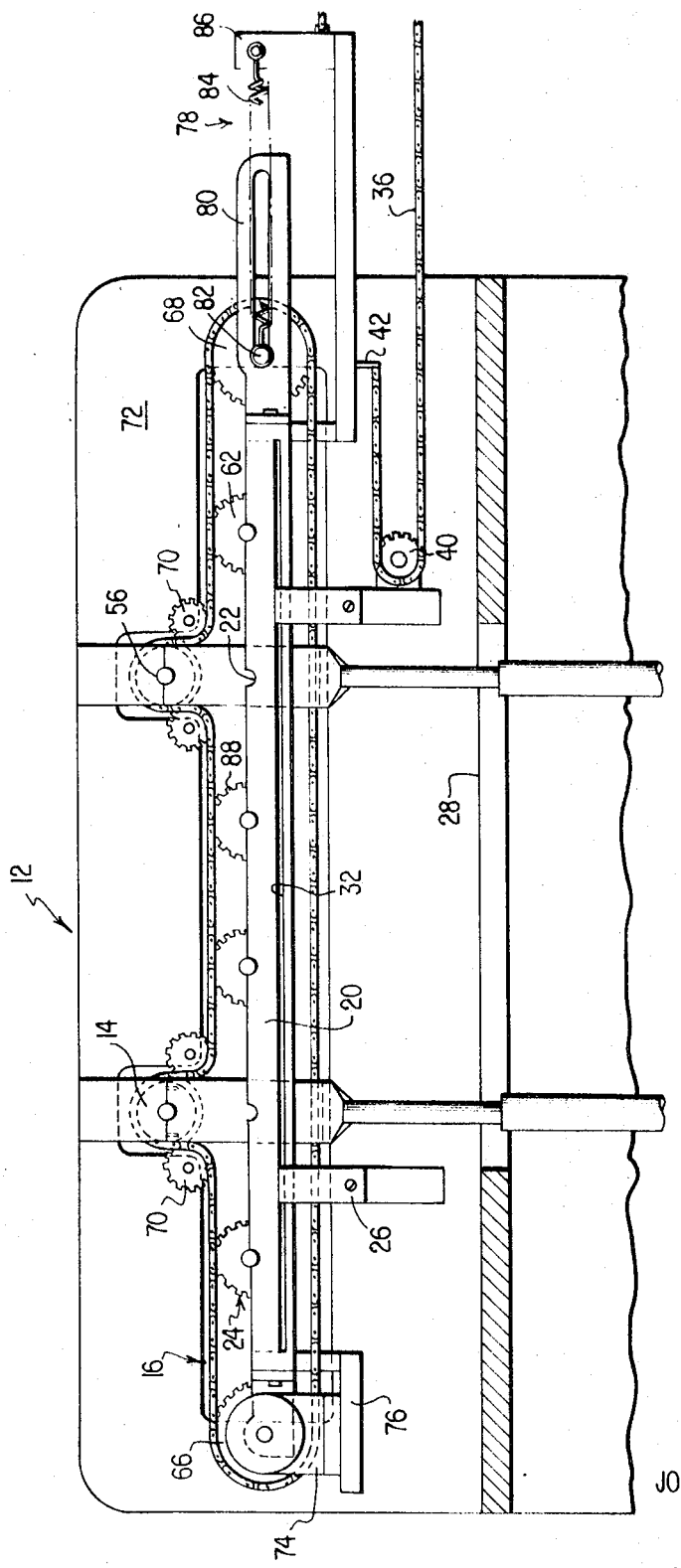

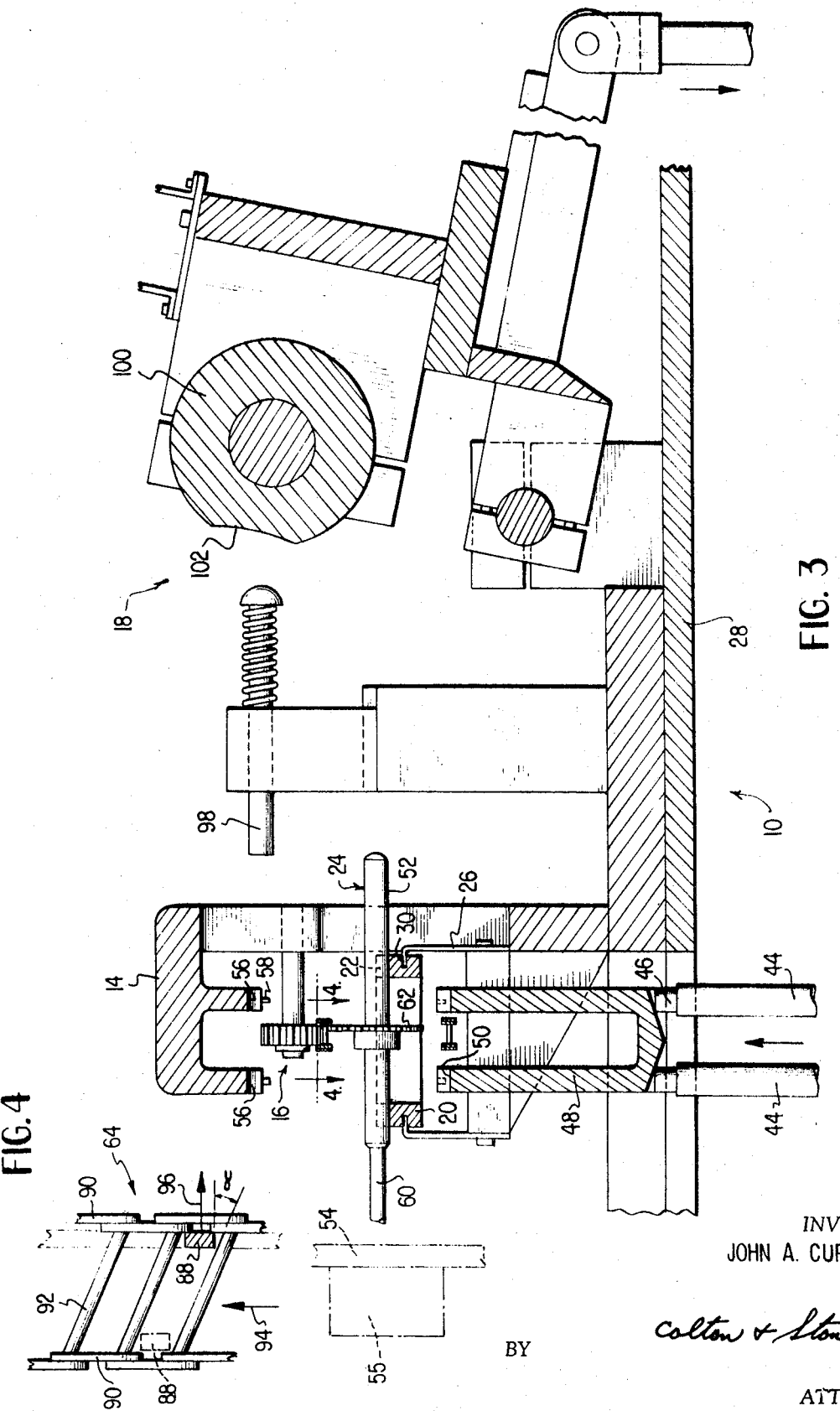

METHOD AND APPARATUS FOR CONDUCTING MACROMACHINING OPERATIONS

CROSS REFERENCE TO RELATED APPLICATION

The present application is a continuation-in-part of copending application Ser. No. 715,711 filed Mar. 25, 1968, now U.S. Pat. No. 3,478,419, Nov. 18, 1969.

BACKGROUND OF THE INVENTION

The noncaptive tool changer principles introduced by the disclosure in the aforesaid copending application have not previously been considered applicable to the larger size tools employed in the machining industry. The basic problems involved in the adaptation of these principles to very large tools are the transmission of a positive drive to the working tool as opposed to a friction drive which was previously considered to be the only practicable method of insuring that the working tool would be at maximum r.p.m. at the instant of placement in working position; a method of positively restraining a working tool against lateral displacement from its working position under the influence of very large lateral forces which would be involved in a milling operation, for example, while yet insuring that the restraint is released as a function of the initiation of a tool change cycle so that all the advantages of a noncaptive tool changer, particularly as regards speed of tool interchange, may be retained; and the advancement and retraction of a working tool while the same is positively driven by an inextensible drive as opposed to the flexible friction drive previously employed.

Previous tool changers employed with very large tools have an extremely slow tool interchange cycle for the reason that it is necessary to interrupt the working tool drive, unchuck both the working tool and the nonworking tool with which the working tool is to be interchanged, rechuck the new working tool, and bring the same up to working r.p.m. All of the foregoing steps were eliminated by the advent of the noncaptive tool changer whose construction was such, however, that it was not readily adaptable for use with very large tools for the reasons stated above.

SUMMARY OF THE INVENTION

The invention is directed to a noncaptive macrotool changer. A positive drive is transmitted to each of a plurality of both working and nonworking tools in such a manner that each tool is at working r.p.m. at all times. The nonworking tools, resting in a tool support rack, are driven at the same r.p.m. as the working tools in their respective bearings by a common modified sprocket chain in driving engagement with a sprocket on each tool. The nonworking tool sprockets are engaged by the chain throughout a relatively small peripheral arc while the driving chain is wrapped approximately 180° about the periphery of the working tool sprockets to insure that the torque applied to the tool driving sprocket is distributed among a large number of the sprocket teeth.

The usual problems inherent in overcoming large inertial forces such as are involved in quickly bringing a shaft of large mass up to high r.p.m. are eliminated by the simple expedient of a tool changer design which permits all of the nonworking tools to be gradually brought up to working r.p.m. prior to the commencement of the first working cycle. Thereafter, all of the tools are rotated at the same r.p.m. irrespective of their working or nonworking role at a particular time; the only difference in the drive imparted to the various tools being that the drive chain is wrapped about a substantially greater portion of the periphery of the working tool sprocket.

An unusually wide sprocket chain design allows the working tool to be infed while under the influence of the positive drive imparted thereby and a novel link pin arrangement insures that each working tool will be retracted following the termination of each positively imparted tool-infeeding motion.

DESCRIPTION OF THE DRAWINGS

FIG. 1 is a fragmentary front elevation of the tool change portion of a tool changer constructed in accordance with the present invention and illustrating a plurality of tools in nonworking position;

FIG. 2 is a view similar to FIG. 1 showing two of the tools in working position;

FIG. 3 is a broken sectional view, with parts in elevation, of the tool change and infeed section of the tool changer in nonworking position; and FIG. 4 is a view taken along line 4-4 of FIG. 3.

DESCRIPTION OF THE PREFERRED EMBODIMENT

With the exception of the tool change and tool driving mechanisms shown in FIGS. 1—4, the tool changer construction and the various controlling mechanisms therefore may be substantially the same as is fully described in great detail in applicant's copending application Ser. No. 715,711 filed Mar. 25, 1968, now U.S. Pat. No. 3,478,419; and reference may be had thereto for a more complete description of the various associated mechanisms which will vary from that disclosed in the instant application only as regards size and power requirements.

The macrotool changer is fragmentarily indicated in its entirety by the reference character 10 and includes tool change mechanism 12, stationary tool bearings 14, tool driving mechanism 16 and tool infeeding mechanism 18.

TOOL CHANGE MECHANISM

The tool change mechanism includes a tool support rack 20 presenting a generally rectangular framelike appearance in plan and provided with aligned pairs of semicylindrical tool supporting recesses 22 for supporting tools 24 in bridging relation to, and extending beyond, both longer sides of the rectangular support rack as shown in FIG. 3. In addition to providing tool support, recesses 22 provide open bearings in which the tools may rotate for a purpose to be subsequently described and are, accordingly, lined with an appropriate antifriction plain bearing material. Heavy support arms or brackets 26 extending upwardly from base support table 28 are provided with inturned ends 30 engaging similarly shaped slots 32 in the sides of support rack 20 to support the same for reciprocal movement relative thereto. Controlled stepwise reciprocation is imparted to tool support rack 20 by a reversible stepper motor 34 drivingly interconnected with rack 20 through a timing chain 36 which is anchored at one end of rack 20 and after passing about timing sprocket 38 and a spring-loaded chain tensioning and reversing pulley 40 is anchored, at its other end, to an intermediate portion of rack 20 as at lug 42. Alternatively, the rack may be spring biased in one direction and positively driven in the opposite direction. A pair of parallel connected fluid motor cylinders, schematically indicated at 44 in FIG. 3, are rigidly carried by table structure 28 and have integrally formed with their piston rods 46 a saddle-shaped tool-retaining element 48 whose upper end is provided with semicylindrical bearing recesses 50 having radii substantially equal to that of the tool spindles 52 comprising a functionally integral part of each tool 24. The number of fluid-actuated tool retaining elements 48 correspond to the number of bearings 14 with which they are aligned which in turn, defines the number of work stations at which the same or different machining operations may be simultaneously performed on an equal number of workpieces 54 schematically illustrated as being supported at work station 55 in FIG. 3.

STATIONARY TOOL BEARINGS

Stationary tool bearings 14 are rigid with support table 28 and include spaced pairs of downwardly opening semicylindrical recesses 56 which are mirror images of the upwardly opening recesses 50 on tool-retaining elements 48 and together therewith form a composite bearing structure. A pair of pins 58 adjacent each bearing recess 56 interfit with similarly formed blind bores, not shown, in tool-retaining elements 48 in the tool-working position of FIG. 2. Although semicylindrical bearing surfaces or recesses 56 are herein illustrated, the invention may be practiced using any desired type of open or noncaptive bearing such as a V-bearing, for example.

TOOL DRIVING MECHANISM

Each tool 24 includes an elongate spindle portion 52 herein illustrated as being integrally formed with the working end portion 60 and a tool driving sprocket 62 illustrated as being press-fitted adjacent the midportion of the spindle. It is apparent that the spindle may be formed separately from the tool-working portion and the same chucked therein, if desired.

A heavy duty tool drive chain 64 extends from a motor driven sprocket 66 through a lower run beneath support rack 20, about tensioning sprocket 68 and returns above the level of rack 20 and in driving engagement with the lower peripheral portions of idler sprockets 70 journaled on fixed frame structure 72 upstanding from base support 28. Motor 74, driving sprocket 66, is mounted on motor support 76 which is structurally integral with support rack 20 as is the tensioning sprocket frame structure 78 which includes a pair of parallel slotted arms 80 mounting shaft 82, on which sprocket 68 is journaled, for movement between the positions shown in FIGS. 1 and 2 against the bias of spring 84 interconnecting shaft 82 and upstanding bracket 86 on frame structure 78. The vertical spacing of the upper run of chain 64 relative to rack 20 is such as to insure that at least one of the sprocket teeth 88 on each of tool-driving sprockets 62 is in driving engagement therewith at all times. Thus, in the nonworking position of FIG. 1, each tool 24 is constantly driven by chain 64 as are the four idlers 70. Pressurization of cylinder units 44 results in upward movement of tool-retaining elements 48, intermediate the longer sides of tool rack 20, to bodily lift the aligned tools 24 from their rack supported recesses and lift the same into engagement with the aligned pairs of recesses 56 in bearings 14. This is the working position shown in FIG. 2 wherein two of the tools 24 are supported for rotation and linear reciprocation relative to bearing recesses 56 against which the tools are retained by tool-retaining elements 48. One may consider the elements 14 and 48 to form the two parts of a separable composite plain bearing which supports each working tool for both reciprocation and rotation relative to the composite bearing structure.

As the tool-retaining elements or movable components 48 of the composite bearing structure move upwardly to lift the working tools from rack 20, the pair of idlers 70, adjacent each fixed bearing 14, entrain driving chain 64 about approximately 180° of the periphery of the working-tool-driving sprockets; spring 84 yielding to permit this entrainment as indicated in FIG. 2.

Tool drive chain 64 consists of more or less conventional links 90 pivotally interconnected by relatively long pins 92 which are oppositely bent adjacent their end portions so that the parallel sprocket-engaging portions thereof form similar acute angles with respect to the generally vertical planes occupied by links 90. Stated differently, the sprocket teeth engaging portions of pins 92 form an acute angle $\alpha$ with the chain-engaging side of each sprocket tooth 88 so that recirculation of chain 64 in the direction indicated by arrow 94 in FIG. 4 results in the imposition of a perpendicular thrust component on tool 24 in the direction of the arrow 96, or to the right as viewed in FIG. 3. The length of pins 92 is selected to permit the desired infeeding movement of a tool 24 from the solid line position of the sprocket tooth 88 to the phantom line position shown in FIG. 4 which delimits the infeeding movement from right to left in FIG. 3 that may be undergone by a tool 24.

TOOL-INFEEDING MECHANISM

Each working tool is positioned to be engaged at its rearward end by a cam follower 98 which is infed in a reciprocating manner by cone cam 100 mounted for rotation and bodily translation parallel to its axis of rotation as is clearly described in the aforesaid copending application. Rotation of cone cam 100 results in the reciprocation of cam followers 98 and the working tools by virtue of the elongated discontinuity 102 in the otherwise smooth peripheral surface of cone cam 100 once during each 360° rotation of the cam. The tool is infed by bodily translation of the cone cam in the direction of its smaller diameter end and, simultaneously, reciprocated if the cam is rotated while the same is being translated. The manner in which the various drives are imparted to cone cam 100 and the same is automatically withdrawn from and brought into engagement with the cam followers 98 during a tool interchange cycle is fully described in the aforesaid copending application to which reference may be had for a more detailed explanation.

TOOL CHANGER OPERATION

In the particular embodiment illustrated, a tool changer adapted to perform three separate machining operations at each of two work stations will require six separate tools 24 positioned in their respective pairs of supporting recesses 22 in tool support rack 20 prior to the commencement of a first machining operation. This is the position shown in FIG. 1. After placement of tools 24 in the rack 20 with their respective sprockets engaged with drive chain 64, motor 74 is energized to slowly bring all six tools up to working r.p.m. with the tool spindles 52 rotating freely in tool rack recesses 22. Motor 34 is then energized to translate rack 20 to bring the desired tools into vertical alignment with stationary bearings 14. Energization of fluid motors 44 then results in the elevation of the selected tools into engagement with recesses 56 formed in bearings 14 where the same are held by tool-retaining elements 48, which together with bearings 14, form composite bearing supports surrounding the periphery of each tool spindle. This is the working position shown in FIG. 2 and it will be apparent that each working tool may undergo rotation and simultaneous infeeding reciprocation relative to the composite bearing structure. The upward movement of the working tools past the horizontal level of the upper run of drive chain 64 and between fixed idlers 70 results in the entrainment of such drive chain about a substantial peripheral portion of the working-tool-driving sprockets; the spring-tensioned idler sprocket 68 yielding to permit such entrainment.

The cone cam 100 is then rocked forwardly (to the left as viewed in FIG. 3) to engage the two cam followers 98 which, in turn, are positioned to engage the rear ends of the the working tool spindles. Since the working tools as well as the nonworking tools are being driven at all times and since the bias of the inclined chain pins 92 results in the rearward movement of each tool until the tool-driving sprocket teeth 88 engage the rearwardly positioned links 90, as shown in FIG. 4, it is apparent that the dynamic bias imparted to each of the tools by the drive chain will retain the same in the rightmost extreme position as shown in FIG. 3, both in the working and nonworking positions, until a working tool is positively infed toward the workpiece. This function is performed by the cone cam acting through cam followers 98 as previously explained. If the cone cam is translated without rotation, the working tools are rotated and infed without reciprocation and if the cone cam is simultaneously rotated, the tools undergo a small reciprocating movement once during each 360° rotation of the cone cam as the discontinuity in the cone cam surface is presented to the cone cam followers. This advancing reciprocating path of working tool movement is the preferred mode of operation, in most instances, to permit fluid cleaning of the workpiece and to avoid overheating of the tools.

Following the completion of the infeeding movement imparted to the first working tools, the infeeding movement of which is limited by the width of driving chain 64 permitting transverse movement of the sprocket teeth 88 relative thereto, cone cam 100 is rocked rearwardly as indicated by the arrow in FIG. 3 and the retaining elements 48 are retracted to lower the working tools back into their support rack recesses 22. Thereafter, motor 34 is again energized to translate rack 20 and bring the second working tools into vertical alignment with bearings 14 and the aforedescribed procedure is repeated.

It will be apparent that separate, rigid mechanical locks may be employed in conjunction with the tool-retaining elements if the size of the tools involved makes it unfeasible to rely solely on the holding force of the cylinder units 44 to retain elements 48 in positive engagement with fixed bearings 14. Such additional locking means would be actuated and deactuated as a function of the initiation of a tool change cycle so that the locking and unlocking operation is entirely automatic.

I claim:

1. A tool changer including a work station and tool infeed means spaced therefrom, bearing means positioned intermediate said work station and tool infeed means to support a working tool for simultaneous rotary and reciprocating movement relative thereto, tool support means mounted for movement relative to said bearing means for supporting a plurality of nonworking tools for simultaneous rotation adjacent said bearing means, drive means for imparting simultaneous rotation to said working tool and said nonworking tools, and means for bodily interchanging rotating tools between said bearing means and said support means.

2. The tool changer of claim 1 wherein said bearing means comprises a composite bearing defined by fixed and moveable bearing components.

3. The tool changer of claim 2 wherein each of said bearing components comprise open bearings, one of said components being included in said means for bodily interchanging rotating tools.

4. The tool changer of claim 1 wherein said drive means includes dynamic biasing means for acting on said working tool in opposition to said tool infeed means.

5. The tool changer of claim 1 wherein said drive means includes dynamic biasing means for biasing all of said tools in a direction away from said work station.

6. The tool changer of claim 5 wherein said drive means includes a drive chain having spaced links and said biasing means comprises link pins forming acute angles with said links.

7. A tool changer including a work station and tool infeed means spaced therefrom, bearing means positioned intermediate said work station and infeed means, tool support means supporting a plurality of spindle-mounted tool means for rotation relative to said support means and for collective bodily translation relative to said bearing means, drive means in constant driving engagement with each of said tool means for rotating the same, means for bodily interchanging the constantly driven rotating tool means between said support means and said bearing means, and means for infeeding said tool means in the direction of said work station relative to said bearing means.

8. A method of performing sequential operations on a single workpiece, comprising; positioning a rotating working tool in machining position in engagement with tool bearing means defining a tool infeed axis, supporting a plurality of rotating nonworking tools adjacent said bearing means, infeeding said working tool relative to said bearing means along said axis and machining said workpiece, and interchanging one of said last-named tools with said first-named tools while continuing the rotation of all of said tools.